Aug. 12, 1952     W. V. WILLIAMS     2,606,514
MACHINE FOR FORMING AND SEWING FRINGE

Filed Aug. 9, 1949                             9 Sheets-Sheet 2

INVENTOR.
WILLIE V. WILLIAMS
BY
ATTORNEY

Aug. 12, 1952     W. V. WILLIAMS     2,606,514
MACHINE FOR FORMING AND SEWING FRINGE
Filed Aug. 9, 1949

INVENTOR.
WILLIE V. WILLIAMS
BY
ATTORNEY

Aug. 12, 1952 W. V. WILLIAMS 2,606,514
MACHINE FOR FORMING AND SEWING FRINGE
Filed Aug. 9, 1949 9 Sheets-Sheet 6
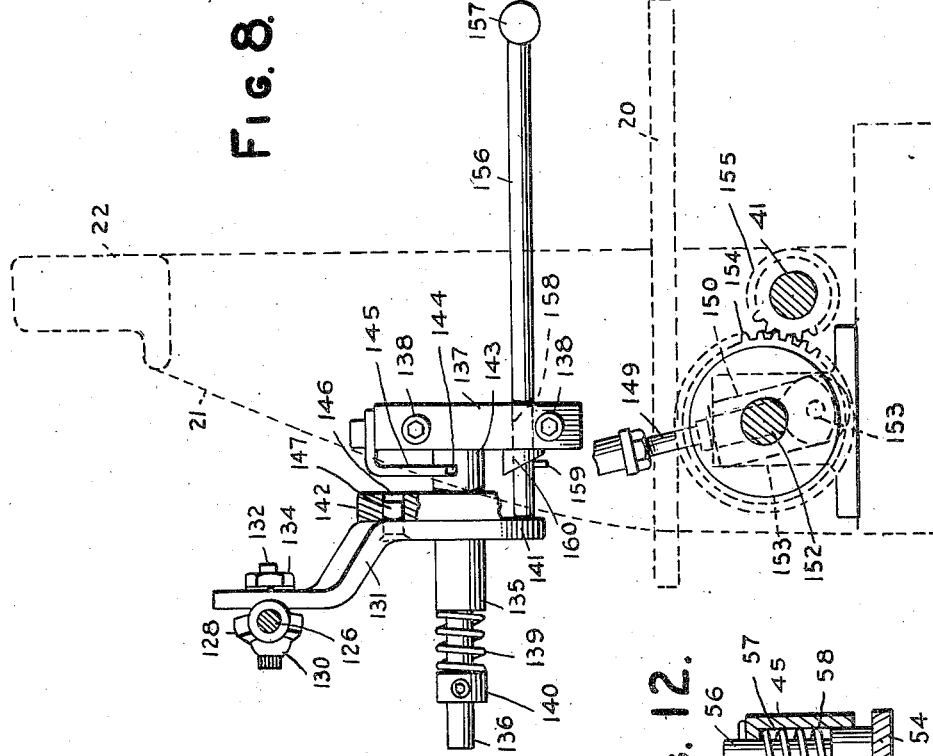
INVENTOR.
WILLIE V. WILLIAMS
ATTORNEY

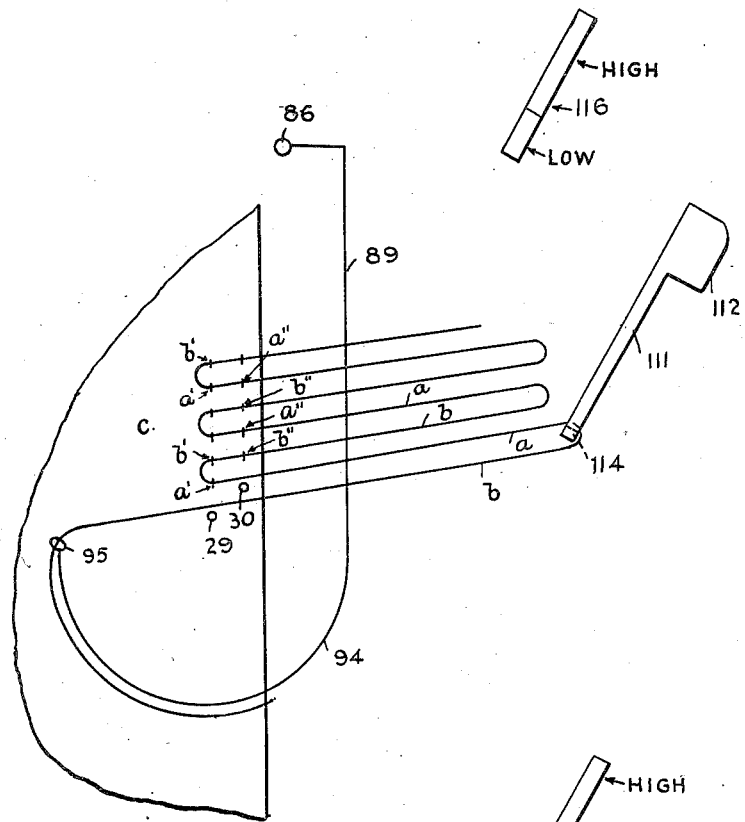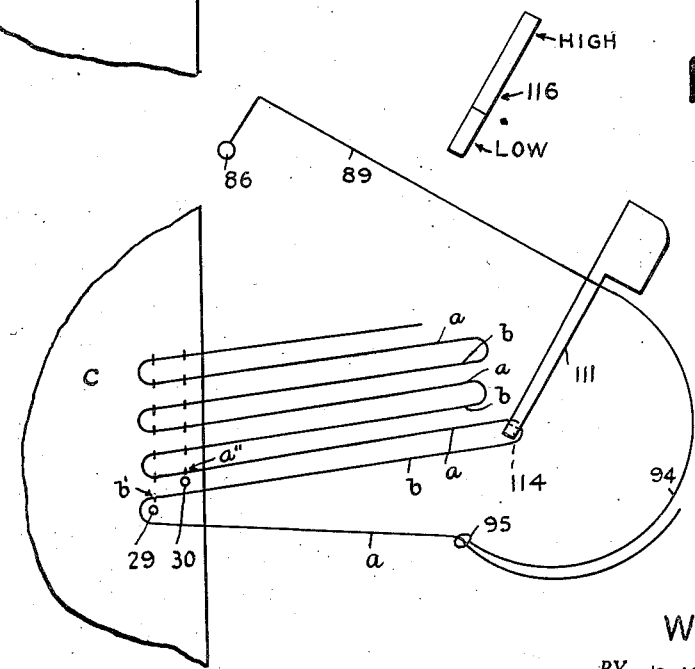

Aug. 12, 1952  W. V. WILLIAMS  2,606,514
MACHINE FOR FORMING AND SEWING FRINGE
Filed Aug. 9, 1949  9 Sheets-Sheet 8

INVENTOR.
WILLIE V. WILLIAMS

Aug. 12, 1952 W. V. WILLIAMS 2,606,514
MACHINE FOR FORMING AND SEWING FRINGE
Filed Aug. 9, 1949 9 Sheets-Sheet 9

INVENTOR.
WILLIE V. WILLIAMS
BY
ATTORNEY

Patented Aug. 12, 1952

2,606,514

UNITED STATES PATENT OFFICE 2,606,514

MACHINE FOR FORMING AND SEWING FRINGE

Willie Vincent Williams, Dalton, Ga.

Application August 9, 1949, Serial No. 109,373

18 Claims. (Cl. 112—64)

My invention relates to a machine for forming and sewing fringe upon the base of a bedspread, mat, rug, or other articles.

An important object of the invention is to provide a machine of the above mentioned character which is automatic and continuous in operation.

A further object of the invention is to provide a machine of the above mentioned character which will sew both sides of each loop to the base at inner and outer points, forming a header which serves to retain the fringe in position upon the base.

A further object of the invention is to provide a looper for co-action with the shuttle arm, which looper is properly timed in operation with respect to the shuttle arm for opening and closing movement.

A further object of the invention is to provide a presser foot assembly, having a front part above which the yarn is manipulated in the formation of the loop, and the formed loop sewed to the base and passed beneath the rear portion of the presser foot as the base is fed by the work feed means.

A further object of the invention is to provide a presser foot assembly which is individually adjustable to compensate for varying thicknesses due to the fringe loops upon the base.

Other objects and advantages of the invention will be apparent during the course of the following description.

Figure 1:
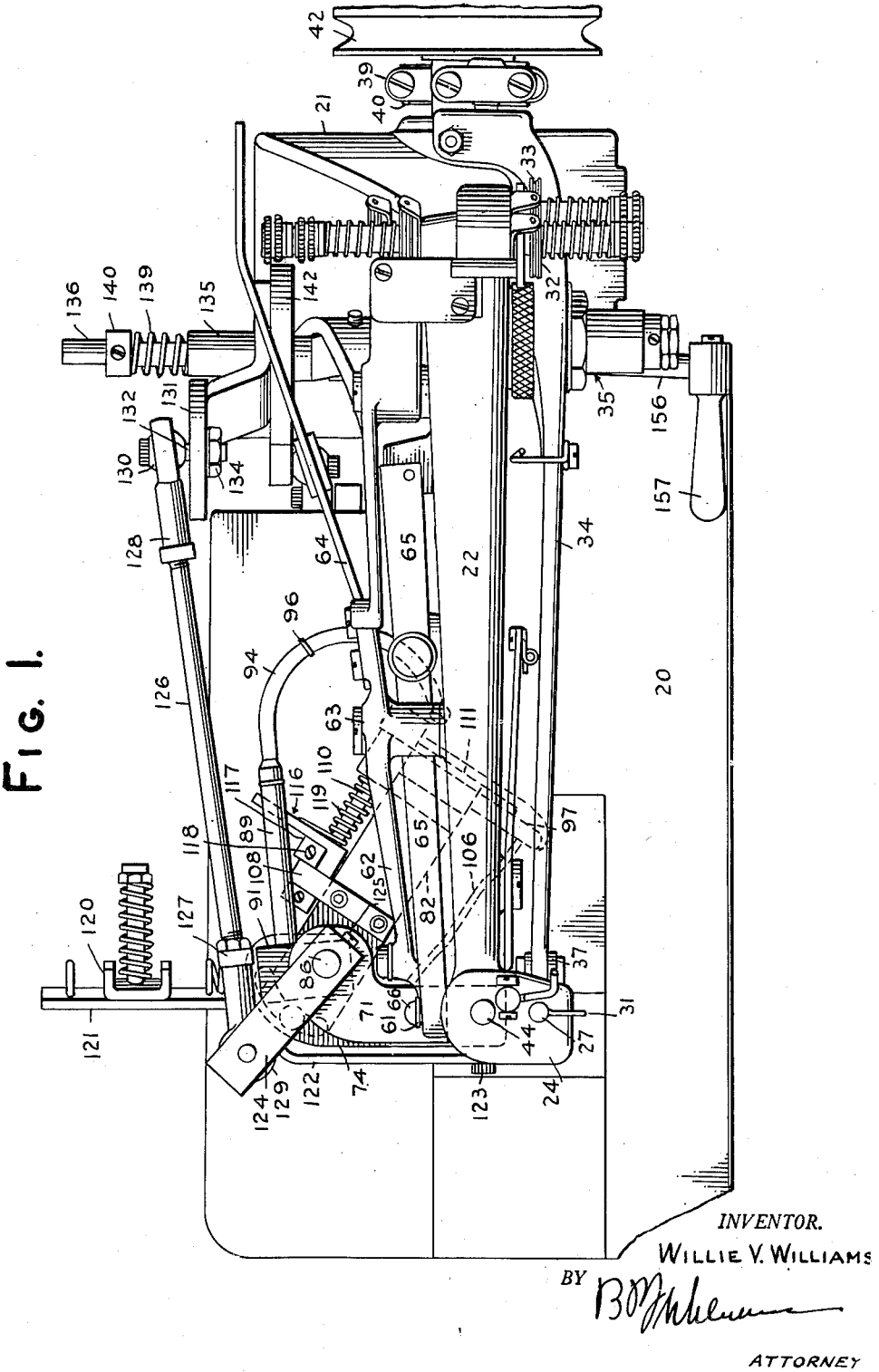
Figure 2:
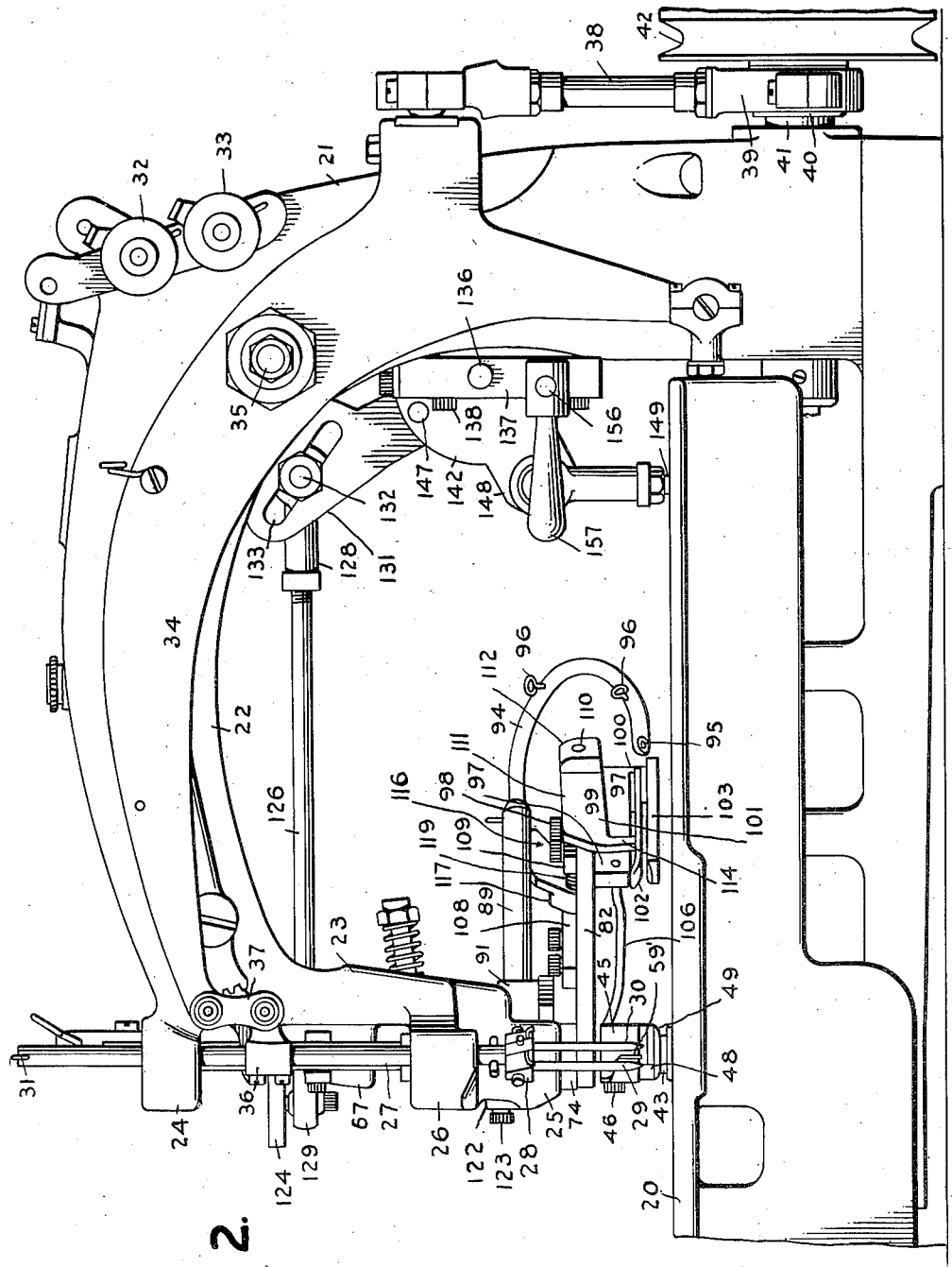
Figure 3:
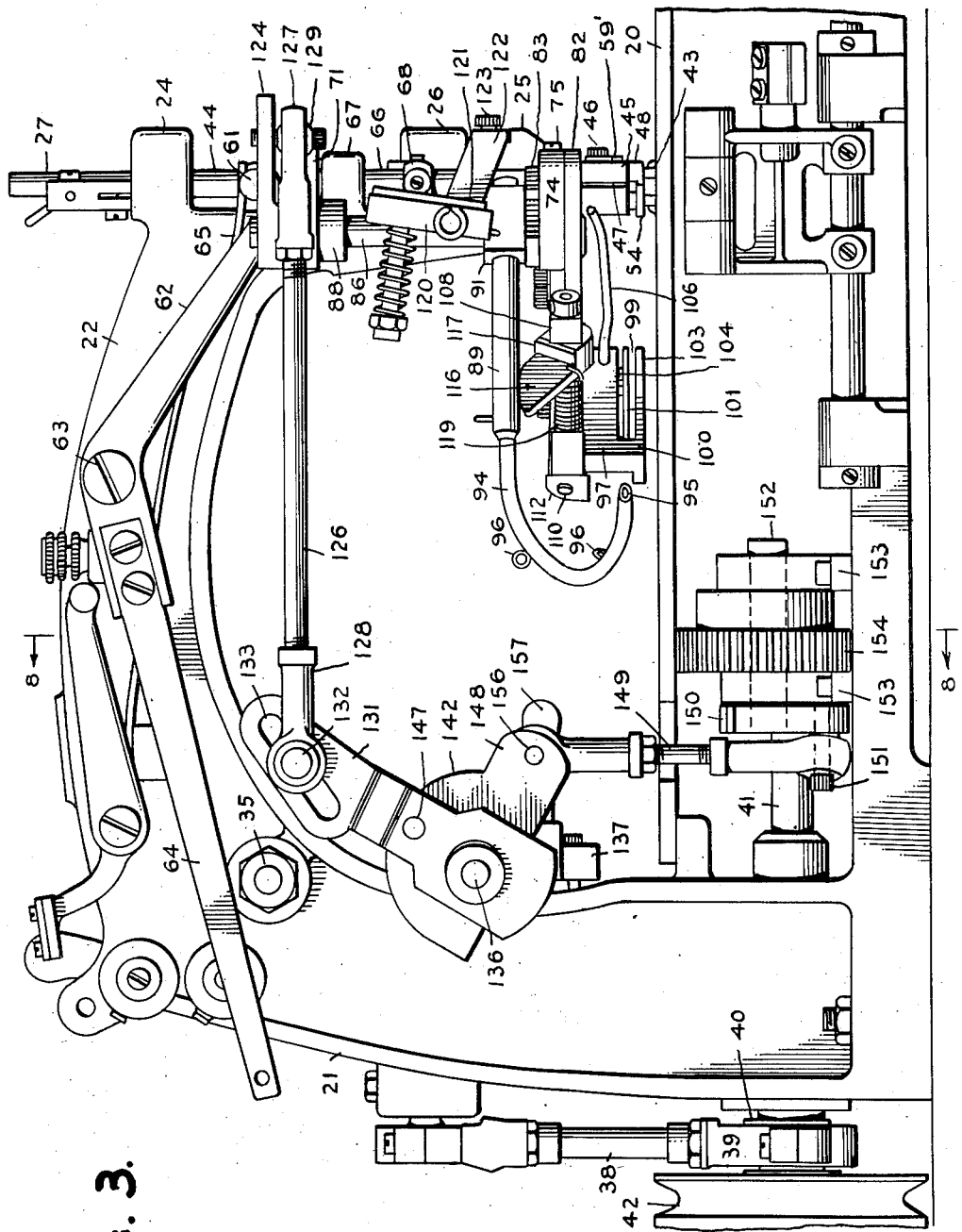
Figure 4:
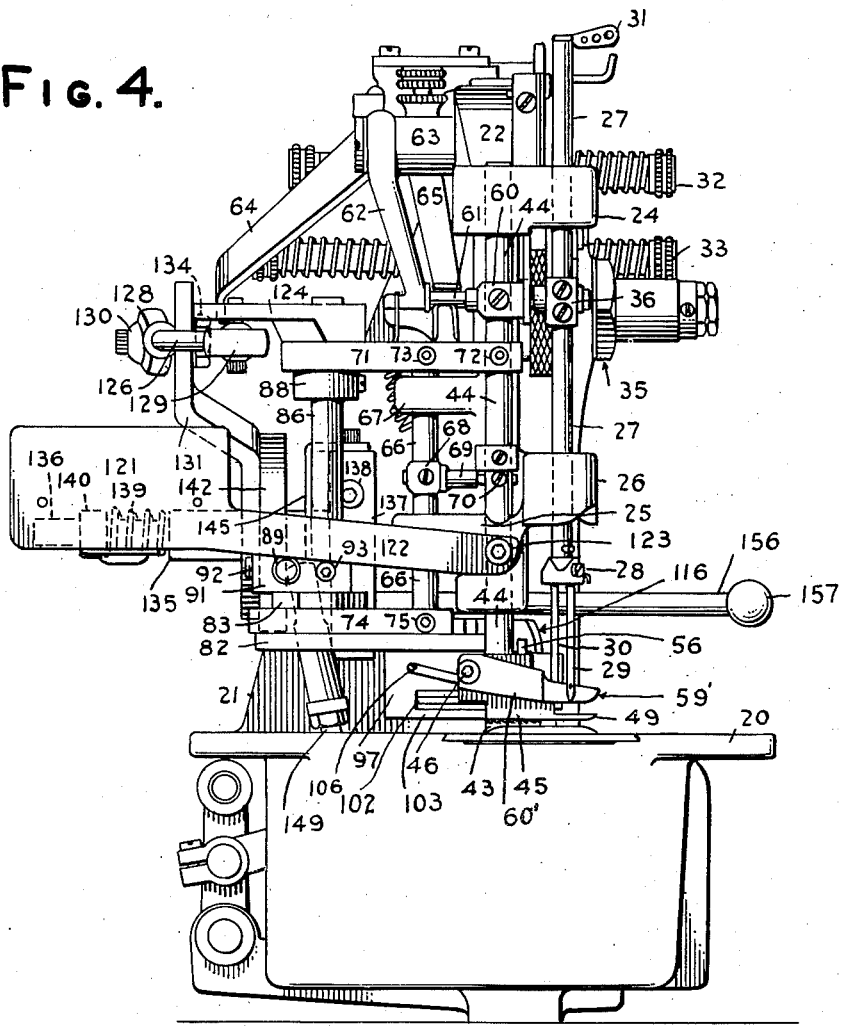
Figure 5:
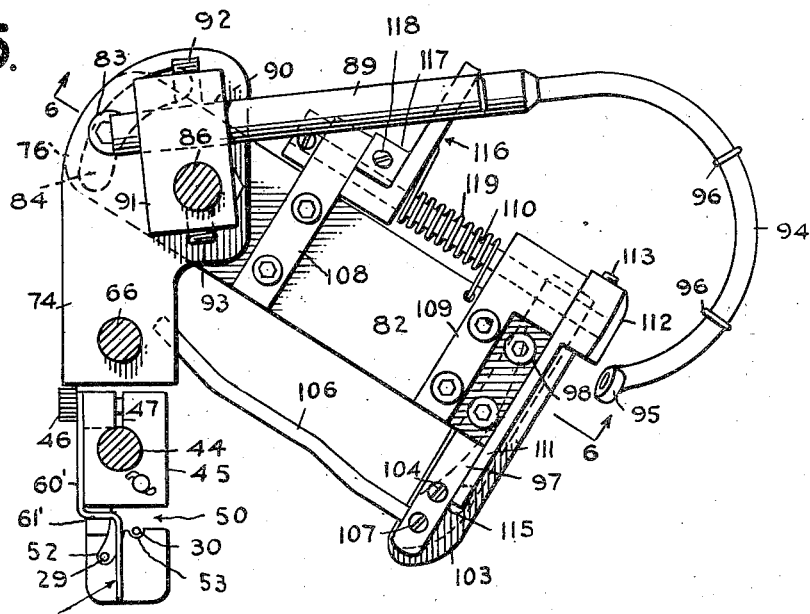
Figure 6:
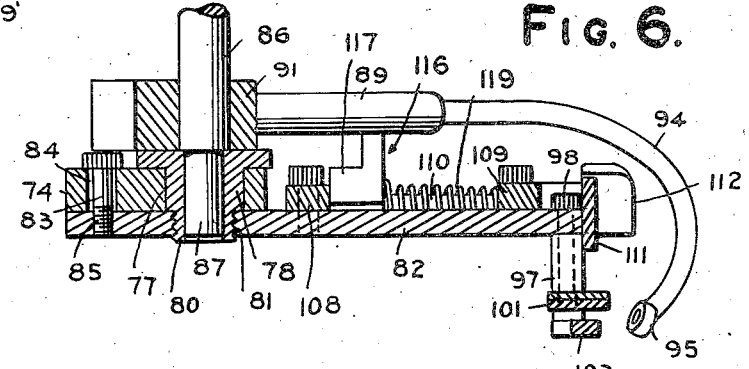
Figure 7:
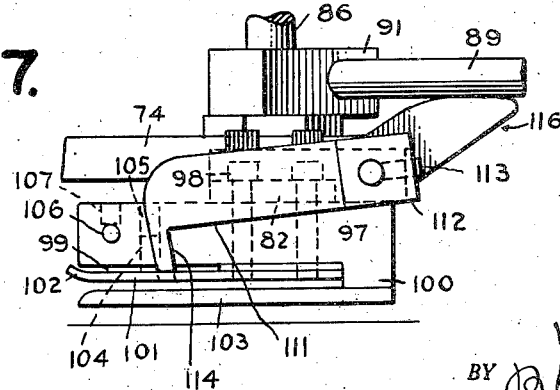
Figure 15:
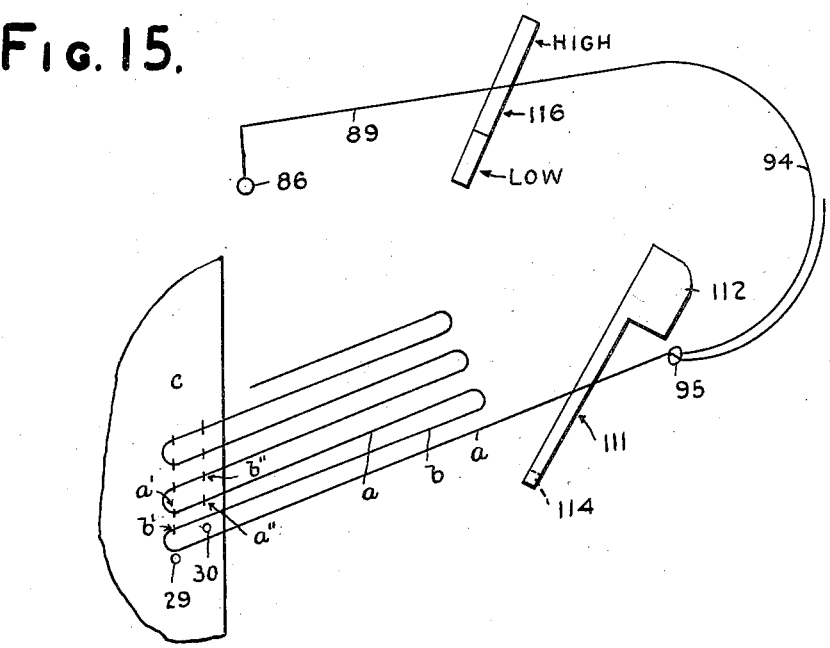
Figure 16:
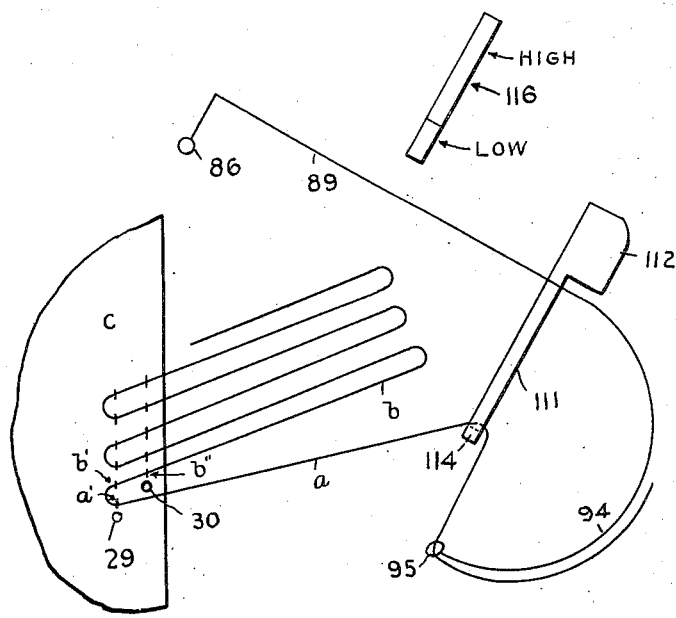
Figure 17:
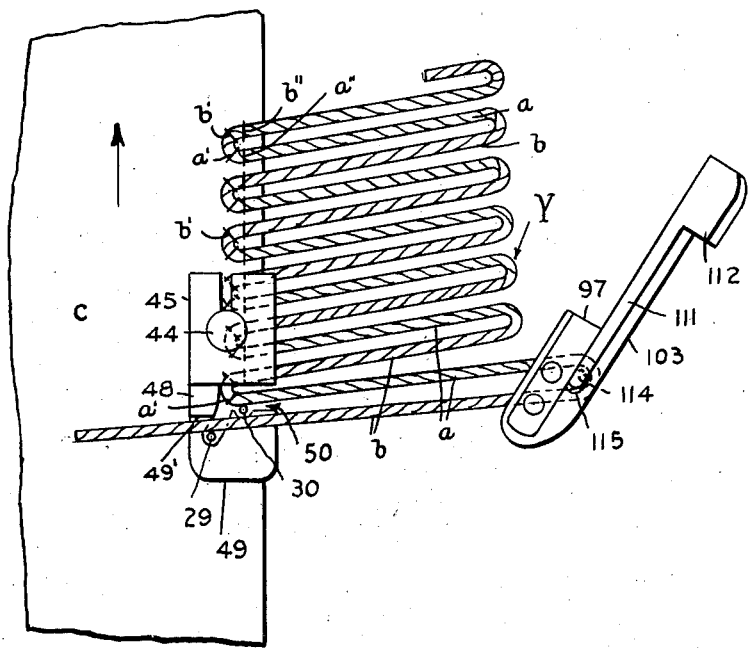
Figure 18:
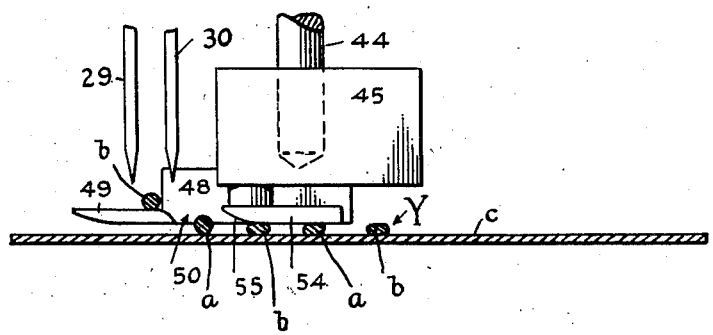

In the accompanying drawings, forming a part of this application, and in which like numerals are employed to designate like parts throughout the same, Figure 1 is a plan view of a fringe-forming and sewing machine embodying my invention, Figure 2 is a side elevation viewed from the front side, Figure 3 is a similar view, viewed from the rear side, Figure 4 is a front end elevation of the machine, Figure 5 is a plan view of the looper and associated elements, parts being shown in horizontal section, Figure 6 is a vertical longitudinal section taken on line 6—6 of Figure 5, Figure 7 is a side elevation of the looper and associated elements, parts omitted and parts broken away, Figure 8 is a side elevation of a clutch device, parts being taken in section on line 8—8 of Figure 3, Figure 9 is a plan view of a presser foot assembly, Figure 10 is a side elevation of the same, Figure 11 is an end elevation of the same, Figure 12 is a vertical section taken on line 12—12 of Figure 9, Figure 13 is a diagrammatic view showing the shuttle arm in the starting position and the needles raised, Figure 14 is a diagrammatic view showing the shuttle arm partly retracted and the needles in the lowermost position, Figure 15 is a diagrammatic view showing the shuttle arm completely retracted and the needles in the raised position, Figure 16 is a diagrammatic view showing the shuttle arm in the intermediate retracted position and the needles in the lowermost position, Figure 17 is a plan view of the presser foot and looper, associated elements omitted, showing the yarn applied thereto in the formation of the fringe, Figure 18 is a side elevation of the presser foot, showing the fringe in section, illustrating the passage of the fringe from the upper face of the front presser foot section to the lower face of the rear presser foot section.

The machine embodies a sewing machine comprising a horizontal base 20, a vertical stock 21, a horizontal arm 22 and a head 23. The head 23 has an upper guide block 24 formed integral therewith and also has a lower guide block 25, integral therewith, having a guide block 26 integral with the guide block 25 and disposed at an elevation above the same. The guide blocks 24 and 25 have vertical openings formed therein for receiving a vertical reciprocatory needle bar 27, having a block 28 rigidly mounted upon its lower end having means for detachably and rigidly engaging needles 29 and 30, which are laterally spaced and longitudinally spaced with respect to the direction of travel of the work. Needle 29 is the front needle and needle 30 the rear needle. At its top, the needle bar 27 is equipped with a thread guide 31, and 32 and 33 are thread tension devices for the thread passing through the thread guide 31. The needle bar is reciprocated by means of a vertically swinging lever 34, pivoted upon the stock 21 at 35, and having its forward end pivotally connected with a block 36 by means including a link 37. The block 36 is clamped to the needle bar. Beneath the pivot 35, lever 34 has pivotal connection with a connecting rod 38, which is reciprocated by cam means including a strap 39 secured to the connecting rod and an eccentric 40 rigidly mounted upon the main horizontal drive shaft 41 of the sewing machine. This drive shaft receives rotation from a grooved pulley 42, which may be power driven. The machine sews a chain stitch and the usual loopers are arranged beneath the bed 20 for co-action with the needles 29 and 30, and these loopers are driven from the lever 34. The sewing machine further comprises work feed means including a feed dog 43 and this work feed means is driven from the shaft 41.

The guide lugs 24 and 25 have openings formed therein for receiving a vertical reciprocatory presser foot bar 44 having a block 45 clamped thereto by a set screw 46, and slotted at 47. This block carries a depending portion 48 integral therewith and projecting below the same. The portion 48 has a front presser foot section 49 integral therewith, with a large transverse passage 50 at its rear. The front presser foot section 49 has a rear inclined end 51, and is provided with notches 52 and 53 for receiving the needles 29 and 30. The presser foot comprises a rear section 54, disposed upon one side of the portion 48 and arranged beneath the block 45. The rear section 54 has a vertically inclined front end 55. The section 54 is rigidly secured to a vertical shaft 56, reciprocating within a vertical recess 57 formed in the block 45 and urged downwardly by spring 58, and having its downward movement limited by a pin 59. When in the lowermost position the rear section 54 is substantially flush with the portion or section 49, but the presser foot section 54 is free to rise and fall with respect to the block 45, to compensate for differences in thickness caused by the sewing of the fringe to the fabric base. The yarn is so manipulated that each loop included in the fringe is produced upon the upper face of the section 49 and is sewed to the fabric base while upon the section 49, and after being sewed to the base, is carried rearwardly through the passage 50 and passes beneath the section 54, so that the fabric base may be engaged by the feed dog. The numeral 59' designates a generally horizontal guide finger, arranged near and above the front section 49, and positioned between the needles. This finger is carried by an arm 60' having an offset portion 61'. The arm 60' is secured to the block 45 by the screw 46. A block 60 is rigidly mounted upon the presser foot bar 44 and carries a pin 61, having the free end of a lift lever 62 engaging beneath it. This lift lever is pivoted at 63 to the arm 22. The lift lever 62 may be swung upon its pivot to raise its free end by any suitable means and I have shown a lever extension 64 secured thereto, and this lever extension may be manually operated. The pin 61 is urged downwardly by a leaf spring 65, as shown. Disposed near and upon one side of the bar 44 is an auxiliary reciprocatory vertical bar 66, slidably mounted within an opening formed in a stationary lug 67 integral with the head 23 and a vertical opening formed in the lug 25. A head 68 is rigidly secured to the auxiliary bar 66 and has a pin 69 rigidly secured thereto, and this pin extends through an opening formed in the presser foot bar 48 and is clamped therein by a set screw 70. It is thus seen that the bars 44 and 66 reciprocate in unison and can not turn upon their longitudinal axes.

The loopers for co-action with the needles for producing the chain stitch, and the work feed means and the driving means therefor, as well as the needles and their operating means, are all conventional and of the type shown in Patents 734,574; 1,127,067; 1,375,531, and 1,266,884. The sewing machine thus far described corresponds substantially to the sewing machines shown in said patents.

The numeral 71 designates an upper horizontal bracket arranged above the guide lug 67 and rigidly secured to the bars 44 and 66 by set screws 72 and 73 respectively, and 74 designates a lower horizontal bracket rigidly secured to the bar 66 by a set screw 75. These horizontal bars project laterally upon the rear side of the machine, as shown. The bracket 74, Figures 5 and 6, is provided with a head 76, having an opening 77 pivotally receiving a bearing sleeve 78, having an upper head 79 and a lower reduced screw threaded portion 80. The reduced screw threaded portion 80 engages within a screw threaded opening 81 formed in a horizontal arm or plate 82, which may be angularly adjusted about the axis of the bearing sleeve 78, which is free to turn, and locked in the selected adjusted position by a headed set screw 83, extending through an elongated curved slot 84 formed in the head 76, tapped into the arm 82, as shown at 85. A vertical rock shaft 86 is provided, having a reduced end 87, Figure 6, journaled in the bearing sleeve 78, and having its upper end journaled in an opening formed in the upper bracket 71. The rock shaft 86 projects above this bracket 71 and has a collar 88 rigidly secured thereto and arranged beneath the bracket 71. The rock shaft 86 may therefore turn upon its axis but is held against longitudinal movement.

A shuttle arm 89 is provided, adjustably mounted within an opening 90 formed in a block 91, and locked to the block in the adjusted selected position by means of a set screw 92. This block 91 has a vertical opening for receiving the rock shaft 86, and the block is locked to the rock shaft in the selected adjusted position by means of a set screw 93. The shuttle arm 89 has a curved reduced portion 94, which is also longitudinally inclined downwardly. At its free end the reduced portion is provided with an eye 95 for receiving the fringe forming yarn, and guide eyes or loops 96 are secured to the shuttle arm to guide the yarn to the eye 95.

A horizontal transverse plate 97 is arranged on edge adjacent to the free end of the arm 82 and is rigidly secured to the arm 82 by screws 98, passing through the arm 82 and tapped into the plate 97. The plate 97 is disposed at a right angle to the arm 82 and has its front end projecting beyond the arm 82, as shown. The plate 97, at its bottom edge, is cut away, forming a horizontal recess 99 and a shoulder 100. A yarn receiving fork is provided, including an upper horizontal tine 101, held in place by the set screws 98 tapped therein, and this tine has an upwardly bent free end 102. The tine 100 is arranged within the recess 99 and above and spaced from a lower horizontal tine 103, the rear end of which is preferably formed integral with the shoulder 100. The upper tine is biased to move from the lower tine 103, and is adjusted toward the lower tine by a screw 104 engaging within an opening 105 formed in the plate 97. At its free end, plate 97 has a transverse opening to receive a generally horizontal guard 106, clamped in place by a set screw 107. Horizontal bearings 108 and 109 are rigidly mounted upon the arm 82 and hold a horizontal rock shaft 110, held against longitudinal displacement. Disposed adjacent to the outer face of the plate 97 is a vertically swinging looper 111, having a head 112 provided with an opening to receive the rock shaft 110 and to be clamped thereto in the selected adjusted position by a set screw 113. The looper 111 has a depending bill 114 to enter an opening 115 formed in the upper tine 101. The bill 114 is adapted to move downwardly to contact with the lower tine 103. The numeral 116 designates a cam having a head 117 provided with an opening to receive the rock shaft 110, and the head is clamped to the rock shaft in the selected adjusted position by a set screw 118. A torsional coil spring 119 surrounds the rock shaft 110 and engages the cam 116 and also engages the arm 82, as shown. This spring 119 will bias the cam 116 upwardly and the looper 111 downwardly. The cam 116 is arranged in the path of travel of the shuttle arm 89 and is depressed by the shuttle arm when the shuttle arm moves rearwardly and this raises the looper.

A yarn tension device 120 is provided, for the fringe forming yarn passing through the guide loops 96 and this tension device is mounted upon a plate 121, carried by an arm 122, clamped to the block 25 by a set screw 123.

Means are provided to turn the vertical rock shaft 86, comprising a crank 124 rigidly secured to the upper end of the rock shaft 86 by a set screw 125. A connecting rod 126 has couplings 127 and 128 longitudinally adjustably connected with its opposite ends. The coupling 127 has a universal pivotal connection at 129 with the crank 124, while the coupling 128 has a pivotal universal connection at 130 with a crank 131. The pivotal connection 130 includes a pin 132 mounted within a slot 133, and locked in a selected adjusted position within the slot by means of a nut 134. The crank 131 is provided with a sleeve 135, slidably mounted upon a transverse horizontal shaft 136, rigidly secured to a bracket 137, rigidly secured to the stock 21 by screws 138 or the like. The sleeve 135 is urged inwardly by a spring 139, bearing against a collar 140 rigidly mounted upon the shaft 136. The lower end of the crank 131 is in the form of a head 141, and this head slidably contacts with a head 142 having a sleeve 143 mounted to turn upon the shaft 136. The sleeve is provided with a fragmental groove 144 receiving a tongue 145 rigidly mounted upon the bracket 137. This tongue and groove permits of the turning movement of the sleeve 143 that holds the sleeve and head against axial movement. The head 142 is provided with a transverse opening 146, to receive a stud or tooth 147, rigidly secured to the head 141. When the stud 147 enters the opening 146, the heads 141 and 142 are locked together and turn in unison. The head 142, Figures 3 and 1, has a crank 148, having a universal pivotal connection with a depending connecting rod 149, extending downwardly for universal pivotal connection with a crank 150, at 151. This crank is mounted upon a horizontal shaft 152 journaled in bearings 153, and the shaft 152 has a gear 154 rigidly secured thereto. The gear 154 engages a smaller gear 155, Figure 8, rigidly mounted upon the main drive shaft 41. The gears 155 and 154 provide a gear ratio of 1 to 2, the gear 155 having 16 teeth and the gear 154 having 32 teeth. It is thus seen that rotation of the shaft 41 will be imparted to the vertical rock shaft 86 to turn it. Means are provided to shift the head 141 axially with respect to the head 142 to move the stud 147 out of the opening 146, to disconnect such heads. This means comprises a horizontal rod 156 having a crank 157. The rod is mounted to slide within an opening 158 formed in bracket 137. The rod 156 has a radial pin 159 rigidly secured thereto arranged to bear against a stationary cam 160 secured to the bracket. When the rod 156 is turned in one direction, the pin 159 will travel upon the cam 160 and the rod 156 will be shifted longitudinally, and the free end of this rod engages the head 141, shifting this head axially and withdrawing the stud 147 from the opening 142. The head 142 may now turn without turning the crank 131.

The operation of the machine is as follows:

The fringe yarn Y passes through the tension device 120 and through the guide eyes 96 to the eye 95. The eye 95 travels in a horizontal plane slightly above the elevation of the presser foot section 49 and the lower tine 103. During this movement, the eye 95 therefore passes the yarn Y between the tines 101 and 103 of the fork for engagement with the bill 114 of the looper and also lays the yarn upon the upper face of the presser foot section 49 and beneath the guide 59'. The loops are originally formed upon the upper face of the presser foot section 49, while the fabric is arranged beneath the presser foot sections 49 and 54. As the operation continues, the sides of the loops are stitched to the fabric c by the needles operating in the notches of the presser foot section 49, and the stitched loops travel with the fabric and pass beneath the presser foot section 54 through the passage 50, as will be more fully explained.

The main drive shaft 41 makes two complete revolutions while the crank 150 is making one complete revolution. For each complete revolution of the main drive shaft 41, the needles start from the uppermost position, move downwardly through the fabric to the lowermost position and return to the uppermost position. During the complete revolution of the shaft 41, the work feed means including the dog 43, is operated, and after the needles move upwardly sufficiently to disengage the fabric, the feed dog advances the fabric for a step.

Figures 13, 17 and 18 show the starting of the cycle of operation of the machine. The needles 29 and 30 are in the raised position and the eye 95 has been shifted to the left for its maximum distance from the bill of the looper. The yarn Y is now manipulated to produce one side $b$ of the loop being formed and this side $b$ is laid upon the upper face of the presser foot section 49 and upon the rear side of the needle 29. Shoulder 49' locates side $b$ between the needles 29 and 30 or their path of travel, Fig. 17. This side $b$ of the loop being formed also engages about the bill 114 of the looper and is held between the bill 114 and the eye 95. The previously formed fringe loops are shown and the needle 29 has stitched sides $a$ and $b$ to the fabric $c$, as indicated at $a'$ and $b'$; while the needle 30 has stitched the sides $a$ and $b$ to the fabric $c$ as indicated at $a''$ and $b''$. The front stitch $b''$ is one feed step behind the front stitch $a'$.

The drive shaft 41 continues to turn and when the needles reach the lowermost position, the eye 95 will be disposed near and in substantial alignment with the bill 114 of the looper, Figure 14. The bill of the looper is in the lowered closed position since the shuttle arm 89 now disengages the high part of the cam 116. The descending needle 29 now forms a stitch $b'$ upon the side $b$ of the last completed loop, still held by the looper, and the descending needle 30 forms the stitch $a''$ upon the side $a$ of the last completed loop being held by in the looper. The stitch $b'$ is formed when the yarn or side *b* is upon the upper face of the presser foot section 49 and hence the stitch is elongated or has slack. When the eye 95 is in the position shown in Figure 14, this eye produces the side *a* of the loop being formed.

The continued movement of the drive shaft 41 brings the eye 95 adjacent to the pivoted end of the looper 111, Figure 15, and the side *a* of the loop being formed is held between the stitch *b'* last formed and the eye 95, since the needles are raised. When the shuttle arm 89 was shifted to the position shown in Figure 15, it engaged the high part of cam 116, which was depressed, and the looper swung upwardly so that its bill 114 was raised out of the path of travel of the side *a* last formed, and held in this raised position. The side *a* last formed is then shifted to a position behind the bill. This upward movement of the looper releases the last completed loop held by the looper, and this last completed loop is thrown laterally from the eye 95 by the action of the last formed side *a*, which is under tension and trips from the looper bill when the looper bill is raised.

Upon further turning movement of the shaft 41, the needles 29 and 30 descend, Figure 16, and when they have reached the lowermost position, the eye 95 is near and in alignment with the looper bill. Previous to this action, the looper has been lowered so that its bill is in the path of travel of the loop forming yarn and the yarn engages behind the bill, forming the companion side *b* of the loop being formed. The shuttle arm 89 moves off of the high part of the cam 116 before the eye 95 reaches the bill 114, so that the bill will be lowered and hold the loop being formed when the eye moves to the front beyond the bill 114, Figures 16 and 13. The needle 29 has now formed a stitch *a'* over the side *a* of the loop being formed, while the needle 30 forms a stitch *a"* over the side *b* of the last completed loop which has been released from the looper. Upon the completion of the rotation of the shaft 41, the needles rise and when they reach the uppermost position, the parts assume the relative positions shown in Figure 13, and the cycle of operation is repeated. The stitches *a'* and *b'* are formed by the needle 29 about the sides of the loop when they are upon the upper face of the looper section 49, and these stitches have length or slack. The stitches *a"* and *b"* are formed about the sides of the loop when such sides are in the recess 50 and these stitches are shorter than the stitches *a'* and *b'*. Since the stitches secure the loops to the fabric *c*, the sides of the loops travel in succession from the upper face of the presser foot section 49 and pass through the recess 50 and become arranged beneath the presser foot section 54, with the fabric *c*.

As clearly shown in Figure 17, the loops are formed and sewed to the fabric *c* by two parallel lines of stitching, forming a header, which tends to hold the loops in place.

When the head 42 is disconnected from the head 141, the sewing machine may continue to operate, while the shuttle arm is inactive. This will enable the operator to continue the lines of stitching for a short distance, without producing fringe loops, which may be advantageous in securing the lines of stitching locked against unravelling.

My invention is also in the nature of an attachment to be applied to a conventional sewing machine which may be of the type shown and described.

It is to be understood that the form of my invention herewith shown and described is to be taken as a preferred example of the same and that various changes in the shape, size and arrangement of parts may be resorted to without departing from the spirit of the invention or the scope of the subjoined claims.

Having thus described my invention, I claim:

1. In a fringe forming and sewing machine, stitching mechanism including an upstanding reciprocatory needle bar, work feed means disposed near the needle bar, a yarn receiving guide disposed near and generally horizontally spaced from the needle bar and including spaced tines having free ends facing toward the needle bar, a reciprocatory looper disposed adjacent to the tines and having a bill to engage with the yarn arranged between the tines, a reciprocatory shuttle arranged near the needle bar and having an eye to receive the yarn and means to move the shuttle in a direction from the needle bar and to cause the eye to pass the yarn between the free ends of the tines and to move the shuttle toward the needle bar and to cause the eye to place the yarn adjacent to the needle, and means connected with the looper to move the same for releasing the yarn.

2. In a fringe forming and sewing machine, stitching mechanism including an upstanding needle bar, a support arranged near and spaced from the needle bar, a yarn receiving guide mounted upon the support and including generally horizontal spaced tines having free ends facing toward the needle bar, a horizontally movable pivoted shuttle mounted upon the support and including an eye to receive the yarn and movable into positions close to the needle and tines, the needle bar and tines being spaced for approximately equal distances from the pivot of the shuttle, means timed in operation with respect to the needle bar to move the pivoted shuttle, a pivoted looper mounted upon the support and disposed adjacent to the tines, a spring to bias the looper closed, and a cam connected with the looper and disposed in the path of travel of the shuttle.

3. In a fringe forming and sewing machine, a base, a drive shaft disposed near the base, a reciprocatory needle bar, means connected with the needle bar and operated from the drive shaft to move the needle bar, a pivoted shuttle arranged near the needle bar and having an eye to receive the yarn, driving means between the drive shaft and the pivoted shuttle to operate the pivoted shuttle, a releasable clutch in the drive means, a reciprocatory looper arranged near the needle bar and being engageable with and releasable from the yarn, means to move the looper for engagement with the yarn, and means arranged in the path of travel of the shuttle to be operated thereby to move the looper for releasing the yarn.

4. In a fringe forming and sewing machine, stitching mechanism including an upstanding reciprocatory needle bar to carry a needle, a feed dog arranged near the needle bar, to feed the fabric in one direction, a presser foot for coaction with the feed dog, said presser foot including a forward section and a rear section having a passage between them, the forward and rear sections being arranged in a group extending longitudinally of the line of feed of the fabric, the forward and rear sections engaging the upper face of the fabric, a movable shuttle having an eye for holding the fringe forming yarn, means for holding the shuttle in place so that its eye travels above and in close relation to the upper face of the forward presser foot section, means connected with the shuttle and moving the same so that its eye travels transversely of the forward section to apply the yarn to the upper face of the forward section adjacent to the path of travel of the needle, a looper to engage the yarn at a point spaced from the path of travel of the needle, and means to move the looper when the shuttle is moved in one direction.

5. In a fringe forming and sewing machine, stitching mechanism including an upstanding reciprocatory needle bar to carry a needle, a feed dog arranged near the needle bar to feed the fabric in one direction, a presser foot for coaction with the feed dog, said presser foot including a forward section and a rear section having a passage between them, the forward and rear sections being arranged in a group extending longitudinally of the line of feed of the fabric, the forward and rear sections being arranged above the fabric, a reciprocatory shuttle having an eye for holding the fringe forming yarn, means for supporting and holding the shuttle in place so that its eye travels in a substantially horizontal plane above and in close relation to the upper face of the forward presser foot section, means connected with the shuttle and moving the same to cause the eye to travel over the forward section and apply the yarn to the upper face of the forward section adjacent to the path of travel of the needle, a reciprocatory looper to engage and disengage the yarn at a point spaced from the needle, and means to move the looper.

6. An attachment for a sewing machine having a reciprocatory needle bar carrying a needle and work feed means, said attachment comprising a presser foot including a forward section and a rear section having a passage between them, said sections being arranged in a group extending longitudinally of the line of feed of the fabric, a shuttle having an eye to receive the fringe forming yarn, means to pivotally mount the shuttle so that the eye moves in a plane slightly above the upper face of the forward section to apply the yarn to such upper face, means connected with the shuttle to move it and means arranged rearwardly of and spaced from the path of travel of the needle so that the yarn may be disposed rearwardly of such path of travel, and a movable looper to engage and disengage the yarn at a point spaced from the needle.

7. In a fringe forming and sewing machine, a base, work feed means arranged near the base, an upstanding reciprocatory needle bar, forward and rear needles carried by the needle bar and spaced longitudinally and transversely with respect to the line of feed of the fabric, a presser foot held near the work feed means and needle bar and including a forward section and rear section and provided with a passage between them, the forward and rear sections being arranged in a group extending longitudinally of the line of feed of the fabric, means forming an upstanding shoulder arranged between the path of travel of the needles so that the yarn will be positioned rearwardly of the forward needle and forwardly of the rear needle when it engages the shoulder, a movable shuttle having an eye to receive the fringe forming yarn, means for holding the movable shuttle in place so that its eye travels in a plane above and close to the upper face of the rear section, means to move the shuttle, and a looper spaced from the needles to engage and disengage the yarn.

8. A presser foot for a sewing machine having a needle, comprising front and rear sections having a passage between the sections, said sections being arranged longitudinally of the line of feed of the work, the forward section having a notch in alignment with the path of travel of the needle, the rear end of the notch discharging into the passage, the presser foot having an upstanding shoulder disposed adjacent to and upon one side of the passage and in alignment with a point located between the ends of the notch.

9. In a fringe forming and sewing machine, stitching mechanism including an upstanding reciprocatory needle bar, work feed means arranged near the needle bar to feed the work in one direction, a presser foot to engage the upper face of the fabric base and move the same toward the work feed means, said presser foot including a forward section and a rear section and provided with a passage between such sections, a shuttle having an eye for holding the fringe forming yarn, means to pivotally support the shuttle so that its eye moves in a substantially horizontal plane slightly above the upper face of the forward presser foot section, means timed in operation with respect to the needle bar to move the shuttle so that the eye travels transversely of the forward presser foot section and places the yarn upon the upper face of the forward presser foot section and forwardly of the passage and adjacent to the needle, a looper to engage the yarn at a point spaced from the needle bar, and means to move the looper in timed order with respect to the shuttle.

10. In a fringe forming and sewing machine, stitching mechanism including an upstanding reciprocatory needle bar to carry a needle, work feed means arranged near the needle bar to feed the work in one direction, a presser foot to engage the upper faces of the fabric base and move the same toward the work feed means, said presser foot including a forward section and a rear section and provided with a passage between such sections, said sections being arranged in a group extending in the direction of the feed of the fabric, a shuttle having an eye for holding the fringe yarn, means to pivotally support the shuttle so that its eye moves in a substantially horizontal plane slightly above the upper face of the forward presser foot section, adjustable means to vary the throw of the shuttle and timed in operation with respect to the needle bar to move the shuttle so that the eye travels transversely of the forward presser foot section and places the yarn upon the upper face of the forward presser foot section and forwardly of the passage and adjacent to the needle, a looper to engage the yarn at a point spaced from the needle bar, an angularly adjustable supporting member carrying the looper and adapted to vary the distance between the looper and needle bar, and means to move the looper in timed order with respect to the shuttle.

11. In a fringe forming and sewing machine, stitching mechanism including an upstanding reciprocatory needle bar to carry a needle, work feed means arranged near the needle bar to feed the work in one direction, a presser foot to engage the upper face of the fabric base and move the same toward the work feed means, said presser foot including a forward section and a rear section and provided with a passage between such sections, said sections being arranged in a group extending in the direction of the feed of the fabric, a shuttle having an eye for holding the fringe yarn, means to pivotally support the shuttle so that its eye moves in a substantially horizontal plane slightly above the upper face of the forward presser foot section and connected with the presser foot to be shifted vertically with it, means to move the shuttle and timed in operation with respect to the needle bar to move the shuttle so that the eye travels transversely of the forward presser foot section and places the yarn upon the upper face of the forward presser foot section forwardly of the passage adjacent to the needle, a looper to engage the yarn at a point spaced from the needle bar and mounted upon the means which pivotally supports the shuttle, and means to move the looper in timed order with respect to the shuttle.

12. In a fringe forming and sewing machine, stitching mechanism including an upstanding reciprocatory needle bar to carry a needle, work feed means arranged near the needle bar to feed the work in one direction, a presser foot to engage the work and move it toward the work feed means, a shuttle having an eye for holding the fringe yarn, means to pivotally support the shuttle so that its eye moves toward and from the needle, adjustable means to vary the throw of the shuttle and timed in operation with respect to the needle bar, a looper to engage the yarn at a point spaced from the needle bar, an adjustable support for the looper to vary the distance between the looper and needle bar, and means to move the looper in timed order with respect to the shuttle.

13. In a fringe forming and sewing machine, stitching mechanism including an upstanding reciprocatory needle bar to carry a needle, a work feed means arranged near the needle bar to feed the work in one direction, a presser foot to engage the upper face of the fabric base and move the same toward the work feed means, said presser foot including a forward section and a rear section and provided with a passage between such sections, said sections being arranged in a group extending in the direction of the feed of the fabric, the forward section having a needle receiving notch having its open end facing in the direction of the work feed and leading into the passage, said forward section having an upstanding shoulder arranged between the forward and rear ends of the notch, a presser foot bar carrying the presser foot, a substantially vertical support connected with the presser foot bar to move therewith, a movable shuttle having an eye for holding the fringe yarn, means to mount the shuttle upon the substantially vertical support so that the eye moves in a substantially horizontal plane slightly above the upper face of the forward presser foot section, means timed in operation with respect to the needle bar to move the shuttle so that the eye travels transversely of the forward presser foot section, a looper mounted upon the substantially vertical support to engage the yarn at a point spaced from the needle bar, and means to move the looper.

14. In a fringe forming and sewing machine, stitching mechanism including an upstanding reciprocatory needle bar, work feed means arranged near the needle bar to feed the work in one direction, forward and rear needle holding devices carried by the needle bar and spaced longitudinally and transversely of the line of work feed and retaining needles correspondingly spaced, a presser foot arranged near the needle bar and work feed means and including a forward section and a rear section and provided with a passage between such sections, said sections being arranged in a group extending in the direction of the line of feed of the fabric, the rear needle operating within the passage, the presser foot having an upstanding shoulder in alignment with a point arranged between the forward needle and the rear needle to position the yarn rearwardly of the forward needle and forwardly of the rear needle, a movable shuttle having an eye for holding the fringe, means to support the shuttle so that its eye moves in a substantially horizontal plane slightly above the upper face of the forward presser foot section, means to move the shuttle so that the eye travels transversely of the forward presser foot section and places the yarn upon the upper face of the forward presser foot section adjacent to the shoulder, a looper to engage and disengage the yarn at a point spaced from the needle bar, and means to move the looper.

15. In a fringe forming and sewing machine, a base, work feed means arranged near the base, an upstanding reciprocatory needle bar disposed near and above the base and having forward and rear devices for receiving forward and rear needles, said devices being spaced longitudinally and transversely with respect to the line of feed of the fabric, a presser foot arranged near the work feed means and needle bar and including a forward presser foot section and a rear presser foot section which are spaced longitudinally with respect to the line of feed of the fabric for providing a passage between them, said presser foot having an upstanding shoulder disposed forwardly of the passage and in alignment with points located between the forward and rear needles to prevent the passage of the yarn behind the rear needle, a guide mounted upon the presser foot and overhanging the front presser foot section and extending longitudinally of the line of feed of the fabric, means including a movable shuttle for applying the yarn to the top face of the forward presser foot section and moving the yarn into engagement with the shoulder, and a looper to engage and disengage the yarn at a point spaced from the needles.

16. In a fringe forming and sewing machine, a base, work feed means arranged near the base, a reciprocatory needle bar having forward and rear devices for holding forward and rear needles, a presser foot arranged near the work feed means and needle bar and including a forward presser foot section and a rear presser foot section and having a passage between them, said presser foot having an upstanding shoulder which is disposed forwardly of the passage and in alignment with a point between the forward and rear needles, said shoulder preventing passage of the yarn behind the rear needle, means including a movable looper to place the yarn upon the top face of the front presser foot section in engagement with the shoulder and between the needles, and a looper to engage with the yarn and disengage the yarn at a point spaced from the needles.

17. In a fringe forming and sewing machine, a base, work feed means arranged near the base, a sewing mechanism including a reciprocatory needle bar, a presser foot arranged near the needle bar and above the work feed means for coaction with the work feed means, releasable means to engage the yarn at a point spaced transversely from the line of feed of the fabric at the needle bar, and means engaging the yarn and arranging the same upon the upper face of a part of the presser foot and disposing the yarn transversely with relation to the direction of feed of the fabric.

18. In a fringe forming and sewing machine, a base, work feed means arranged near the base, sewing mechanism including a reciprocatory needle bar having holding devices which are spaced longitudinally of the direction of the line of the work feed for holding forward and rear needles correspondingly spaced, a presser foot arranged near the needle bar and above the work feed means for coaction with the work feed means, releasable means to engage the yarn at a point spaced transversely from the line of feed of the work, means engaging the yarn and arranging the same upon the upper face of a part of the presser foot and disposing the yarn transversely with relation to the direction of the line of feed of the work, and means to limit the movement of the applied yarn in a rearward direction longitudinally of the line of feed of the work so that the yarn is located rearwardly of the front needle and forwardly of the rear needle.

WILLIE VINCENT WILLIAMS.

REFERENCES CITED

The following references are of record in the file of this patent:

UNITED STATES PATENTS

| Number | Name | Date |
| --- | --- | --- |
| 431,161 | Bellis | July 1, 1890 |
| 1,266,884 | Thompson | May 21, 1918 |
| 1,278,660 | Hughes, Jr. | Sept. 10, 1918 |
| 2,147,128 | Sailer | Feb. 14, 1939 |
| 2,298,296 | Ingwer | Oct. 13, 1942 |